United States Patent
Lee et al.

(10) Patent No.: US 6,789,088 B1
(45) Date of Patent: Sep. 7, 2004

(54) MULTIMEDIA DESCRIPTION SCHEME HAVING WEIGHT INFORMATION AND METHOD FOR DISPLAYING MULTIMEDIA

(75) Inventors: Jin Soo Lee, Seoul (KR); Jung Min Song, Seoul (KR)

(73) Assignee: LG Electronics Inc., Seoul (KR)

( * ) Notice: Subject to any disclaimer, the term of this patent is extended or adjusted under 35 U.S.C. 154(b) by 343 days.

(21) Appl. No.: 09/691,162

(22) Filed: Oct. 19, 2000

(51) Int. Cl.[7] .............................................. G06F 17/30

(52) U.S. Cl. ...................... 707/104; 707/100

(58) Field of Search ............................ 707/104, 100, 707/101, 102; 709/225

(56) References Cited

U.S. PATENT DOCUMENTS 6,457,052 B1 * 9/2002 Markowitz et al. ......... 709/225

* cited by examiner

Primary Examiner—Sanjiv Shah
(74) Attorney, Agent, or Firm—Fleshner & Kim, LLP (57) ABSTRACT

The present invention relates to multimedia indexing using a weight description scheme, and more particularly, to a weight description scheme and a multimedia indexing method using the same which is capable of increasing the performance of multimedia indexing and browsing by effectively describing weight information on multimedia items. A weight description scheme embodying the invention utilizes a weight information type, weight information, and a reliability factor so that each description scheme representing content information of multimedia describes effective weight information.

42 Claims, 11 Drawing Sheets

```
<!--##################################################-->
<!--   Definition of WeightDS as Primitive DS         -->
<!--##################################################-->
<DescType name="Reference">
    <attrDecl name="idref" required="true">
        <datatypeRef name="IDREF"/> </attrDecl>
    <empty/>
</DescType>
<DSType name="WeightValueDS">
    <attrDecl name="value" required="true"><datatypeRef name="real"/></attrDecl>
    <DescTypeRef name="Reference"/>
</DSType>
<DSType name="WeightDS">
    <attrDecl name="ID"><datatypeRef name="ID"/> </attrDecl>
    <attrDecl name="TYPE"><datatypeRef name="string"/> </attrDecl>
    <attrDecl name="reliability"><datatypeRef name="real"/> </attrDecl>
    <DSTypeRef name="WeightValueDS" minOccur="1" maxOccur="*"/>
</DSType>
```

```
<SyntacticStructureDS id="#1"href="http://www.temp.com">
    <WeightDS id="segment_weight0"type="manual"reliability="1.0">
        <WeightValueDS Reference="seg0"value="0.6"/>
        <WeightValueDS Reference="seg10"value="0.7"/>
        <WeightValueDS Reference="seg11"value="0.3"/>
        <WeightValueDS Reference="seg100"value="0.8"/>
        <WeightValueDS Reference="seg101"value="0.3"/>
        <WeightValueDS Reference="seg110"value="0.2"/>
        <WeightValueDS Reference="seg111"value="0.5"/>
    </WeightDS>
</SyntacticStructureDS>
```

FIG.3B

```
<SyntacticStructureDS id="#1"href="http://www.temp.com">
    <WeightDS id="weight_seg0"type="manual"reliability="1.0">
        <WeightValueDS Reference="seg10"value="0.6"/>
        <WeightValueDS Reference="seg11"value="0.4"/>
    </WeightDS>
    <WeightDS id="weight_seg10"type="manual"reliability="1.0">
        <WeightValueDS Reference="seg100"value="0.3"/>
        <WeightValueDS Reference="seg101"value="0.7"/>
    </WeightDS>
    <WeightDS id="weight_seg11"type="manual"reliability="1.0">
        <WeightValueDS Reference="seg110"value="0.3"/>
        <WeightValueDS Reference="seg111"value="0.7"/>
    </WeightDS>
</SyntacticStructureDS>
```

```
<!__##############################################__!>
<!__Definition of SyntaticDS with WeightDS        __!>
<!__##############################################__!>

<DSType name="SyntacticDS"model="refinable">
     <attrDecl name="ID"><datatypeRef name="ID"/> </attrDecl>
     <attrDecl name="href"><datatypeRef name="uri"/> </attrDecl>
     <DSTypeRef name="WeightDS" minOccur="0" maxOccur="*"/>
     <DSTypeRef name="SegmentDS" minOccur="0" maxOccur="*"/>
     <DSTypeRef name="Segment-Relation-Graph" minOccur="0" maxOccur="*"/>

</DSType>
```

```
<!--##################################################-->
<!--Definition of SegmentRelationGraphDS with WeightDS -->
<!--##################################################-->

<DSType name="Segment-Entity-Node">
        <subDSOf name="Entity-Node/">
        <DSType name="WeightDS" minOccur="0" maxOccur="*"/>
        <sequence minOccur="1"maxOccur="*">
                <choice minOccur="0"maxOccur="*">
                        <DescTypeRef name="Reference-to-Segment"/>
                        <DSTypeRef name="Segment"/>
                        <DSTypeRef name="Segment-Entity-Node"/>
                </choice>
                <DSTypeRef name="Segment-Relation"minOccur="0"maxOccur="*"/>
        </sequence>
</DSType>
<DSTypeRef name="Segment-Relation">
        <subDSOf name="Relation/">
        <choice minOccur="1"maxOccur="*">
                <DSTypeRef name="Segment-Relation"/>
                <DSTypeRef name="Segment-Entity-Node"/>
        </choice>
</DSType>
<DSTypeRef name="Segment-Relation-Graph">
        <subDSOf name="Relation-Graph/">
        <DSTypeRef name="WeightDS"minOccur="0"maxOccur="*"/>
        <choice minOccur="1"maxOccur="*">
                <DSTypeRef name="Segment-Relation"/>
                <DSTypeRef name="Segment-Entity-Node"/>
        </choice>
</DSType>
```

```
<!__###############################################__!>
<!__Definition of Semantic DS with Weight DS        __!>
<!__###############################################__!>

<DSType name="SemanticDS" model="refinable">
    <DSType name="WeightDS" minOccur="0" maxOccur="*"/>
    <DSType name="EventDS" minOccur="0" maxOccur="*"/>
    <DSType name="ObjectDS" minOccur="0" maxOccur="*"/>
    <DSType name="Event/RegionRelationGraphDS" minOccur="0" maxOccur="*"/>
</DSType>
```

```
<!--############################################################-->
<!--Definition of EventObjectRelationGraphDS with Weight DS    -->
<!--############################################################-->

<DSType name="Event-Object-Entity-Node">
        <subDSOf name="Entity-Node/">
        <DSType name="WeightDS" minOccur="0" maxOccur="*"/>
        <sequence minOccur="1"maxOccur="*">
                <choice minOccur="0"maxOccur="*">
                        <DescTypeRef name="Reference-to-Event"/>
                        <DescTypeRef name="Reference-to-Object"/>
                        <DSTypeRef name="Event"/>
                        <DSTypeRef name="Object"/>
                        <DSTypeRef name="Event-Object-Entity-Node"/>
                </choice>
                <DSTypeRef name="Event-Object-Relation"minOccur="0"maxOccur="*"/>
        </sequence>
</DSType>

<DSTypeRef name="Event-Object-Relation">
        <subDSOf name="Relation/">
        <choice minOccur="1"maxOccur="*">
                <DSTypeRef name="Event-Object-Relation"/>
                <DSTypeRef name="Event-Object-Entity-Node"/>
        </choice>
</DSType>
<DSTypeRef name="Event-Object-Relation-Graph">
        <subDSOf name="Relation-Graph/">
        <DSTypeRef name="WeightDS"minOccur="0"maxOccur="*"/>
        <choice minOccur="1"maxOccur="*">
                <DSTypeRef name="Event-Object-Relation"/>
                <DSTypeRef name="Event-Object-Entity-Node"/>
        </choice>
</DSType>
```

MULTIMEDIA DESCRIPTION SCHEME HAVING WEIGHT INFORMATION AND METHOD FOR DISPLAYING MULTIMEDIA

BACKGROUND OF THE INVENTION

1. Field of the Invention

The present invention relates to multimedia indexing using a weight description scheme.

2. Description of the Background Art

For content-based image indexing, various feature descriptors such as a color histogram, partial section colors etc. are used. However, since a main feature descriptor for identifying an image varies according to the image, many techniques for adapting weight information on the feature descriptor corresponding to the feature of the image have been provided.

One conventional technique for adapting weight information corresponding to the feature of an image in a system for content-based image indexing includes preparing a window for inputting weight information at a user interface. In this method, the user sets weight information on a feature descriptor during indexing. However, such a conventional method has a problem in that it is difficult for a general user to set a weight information on a feature descriptor corresponding to the image.

In another conventional technique for describing weight information for content-based image indexing, the weight information on a feature descriptor is set using user relevance feedback. In this method, the user first performs an indexing once in the present state. The user then marks whether or not an image is similar to what the user was searching for. The user then provides feedback to the indexing system, thus making the system automatically set or update weight information using the feedback. This method is advantageous in that the system itself automatically sets weight information on a feature descriptor by using the user's feedback.

The above-described techniques according to the conventional art show examples of weighting schemes adapted for a certain type of multimedia, such as an image. However, a demand for content-based indexing and browsing of more complicated multimedia has recently increased. There is now a need for a weighting scheme for integrated multimedia indexing and browsing in order to meet this new demand.

SUMMARY OF THE INVENTION

Accordingly, it is an object of the present invention to enable effective multimedia indexing and browsing by providing an integrated multimedia structure and an efficient weight description scheme according to the structure.

The present invention is a weight description scheme and multimedia indexing method using the same. The invention provides a multimedia description scheme for enabling effective multimedia indexing and browsing by having a weight description scheme (DS) consisting of a weight information type, weight information, and its reliability. In methods embodying the invention, the description scheme represents content information of the multimedia, which allows for a more effective weight description scheme.

A weight description scheme and multimedia indexing method embodying the invention describes weight information on segments or weight information on segment relations in such a manner that the multimedia content weight DS includes a segment DS and a segment relational graph DS. Said multimedia content weight DS may further include more than one weight DS.

Some embodiments of the weight description scheme and multimedia indexing method describe weight information on segment relations or weight information on segment nodes. In such a method, a multimedia content DS has a segment relational graph DS consisting of more than one segment relation DS and more than one segment node DS. Said one segment relation DS may include more than one segment relation DS or more than one segment node. Said one segment node DS may include more than one segment or segment node DS, or more than one segment relation DS. Said segment relation DS may further include more than one weight DS. By describing weight information on segments in such a manner, the segment node DS further includes more than one weight DS.

In addition, some embodiments of the present invention provide a multimedia DS for enabling effective multimedia indexing and browsing by describing weight information on objects, weight information on events, or weight information on event/object relational graphs. In these methods, the multimedia content DS includes a content DS consisting of a plurality of event information, a plurality of object information, and a plurality of event/object relational graph Dss. Also, said content DS may further include more than one weight DS.

In addition, some embodiments of the present invention may provide a multimedia DS for enabling effective multimedia indexing and browsing by describing weight information on relations between events and objects or weight information on event or object nodes. In these methods, a multimedia event/object relational graph DS further includes more than, one weight DS. Also, by describing weight information on events or objects in such a manner, an event or object node DS may further include more than one weight DS.

Embodiments of the present invention may also provide a method of displaying multimedia which makes it possible to perform a multimedia summary display using a multimedia DS, weight DS, and segment relational graph DS.

Embodiments of the present invention may also provide a method of displaying multimedia which makes it possible to display moving images by indexing the same by character and relation using a multimedia DS and content information, weight DS, and an event/object relational graph DS.

Additional advantages, objects and features of the invention will become apparent from the description which follows.

BRIEF DESCRIPTION OF THE DRAWINGS

The present invention will become better understood with reference to the accompanying drawings which are given only by way of illustration and thus are not limitative of the present invention, wherein:

FIGS. 1A and 1B are views illustrating a weight description scheme(DS), wherein FIG. 1A illustrates the weight description scheme DS, and FIG. 1B describes the same in an XML format;

FIGS. 4A and 4B are views illustrating a multimedia syntactic weight description scheme DS with a weight DS, wherein FIG. 4A illustrates the syntactic weight description scheme DS, and FIG. 4B describes the same in the XML format;

FIGS. 5A and 5B are views illustrating a segment relational graph DS with a weight DS, wherein FIG. 5A illustrates the segment relational graph DS, and FIG. 5B describes the same in the XML format;

FIGS. 6A and 6B are views illustrating a multimedia syntactic weight description scheme DS with a weight DS, wherein FIG. 6A illustrates the multimedia syntactic DS, and FIG. 6B describes the same in the XML format;

FIGS. 7A and 7B are views illustrating an event/object relational graph DS with a weight DS, wherein FIG. 7A illustrates the event/object relational graph DS, and FIG. 7B describes the same in the XML format;

DETAILED DESCRIPTION OF THE PREFERRED EMBODIMENTS

Figure 1A:
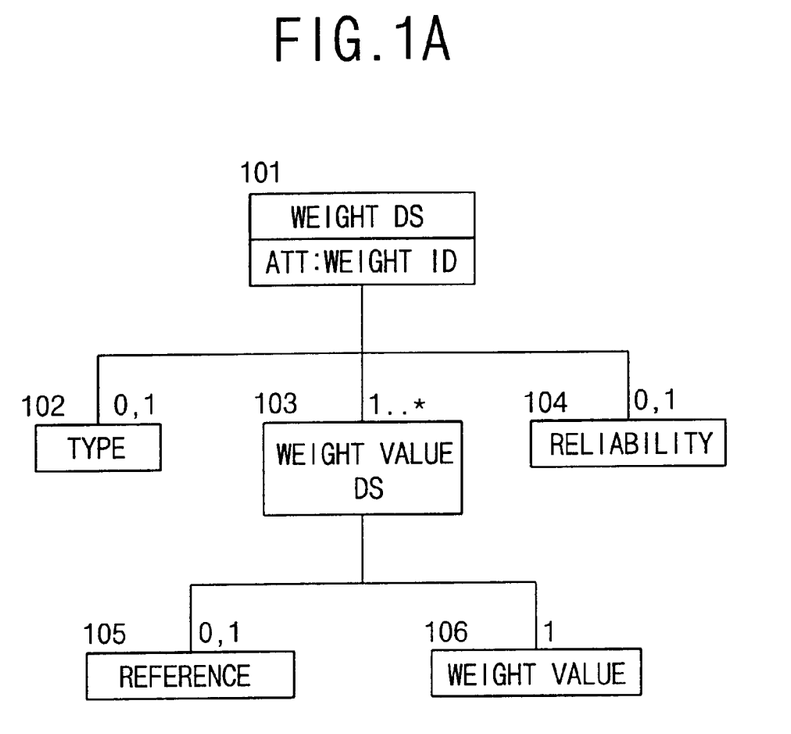
Figure 1B:
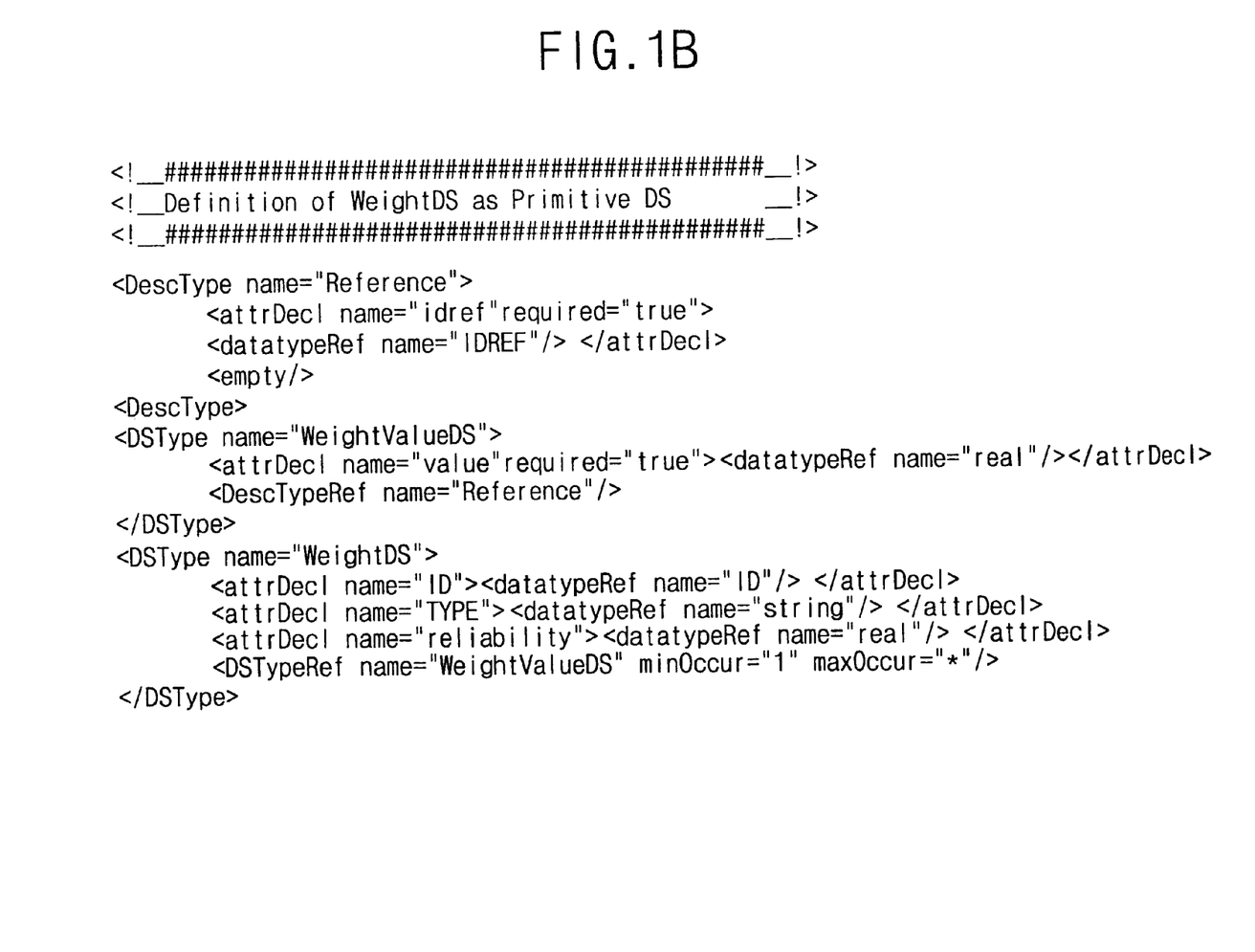

Hereinafter, "description scheme" will be abbreviated "DS". FIGS. 1A and 1B illustrate a weight DS embodying the present invention, wherein FIG. 1A illustrates the weight DS, and FIG. 1B describes the same in an XML format.

As seen from FIG. 1A, a weight DS 101 includes a weight type 102, weight value DS 103, and reliability 104.

The weight type 102 means the criteria for defining a weight value. The same object can have a plurality of items of weight information according to its criteria. For example, two kinds of weight information can be simultaneously described with the respect of the same object. One type of information could be a weight information generated by learning through the user's feedback. A second type of weight information could be a weight information directly designated by an image generator. These two kinds of weight information can be distinguished from each other using the weight type 102.

For example, the weight type of the former one (weight information generated by learning through the user's feedback) could be termed "relevance feedback", and the latter one (weight information directly designated by the image generator) could be termed "manual".

The reliability 104 indicates the reliability of the weight value 103 of an object according to the weight type 102. In other words, it shows if a particular item of weight information is reliable. For example, if the weight type is "relevance feedback", the reliability can be assigned according to how much feedback is provided. If the weight type is "manual", the reliability of a low value or high value can be assigned, respectively, according to whether the person assigning weight information is an inexperienced user or an expert user with respect to the corresponding object.

In FIGS. 1A and 1B, the weight value DS 103 may include a plurality of weight value DSs, each consisting of a reference 105 and a weight value 106.

In the context of a video, "a segment" means a predetermined time portion of the video. Assuming that the video consists of 30 frames per second, a segment having a size of two seconds will consist of 60 frames. If the time interval of the segment is 0, it means one frame. Therefore, a segment DS may describe one or multiple frames of image data.

Figure 2:
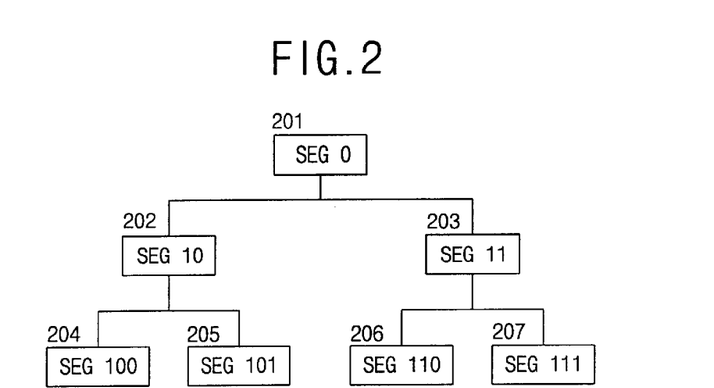
FIG. 2 is a view illustrating a segment weight description scheme DS.
Figure 3A:
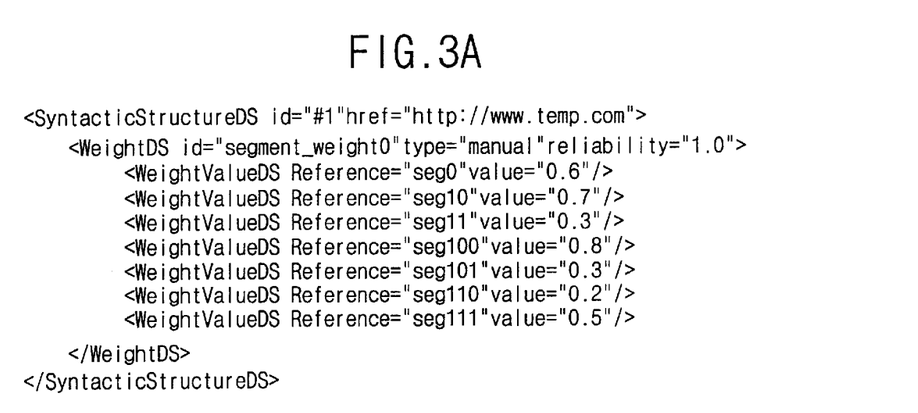
FIGS. 3A and 3B are views illustrating examples of a description of weight information on segments in the segment weight description scheme DS of FIG. 2.
Figure 3B:
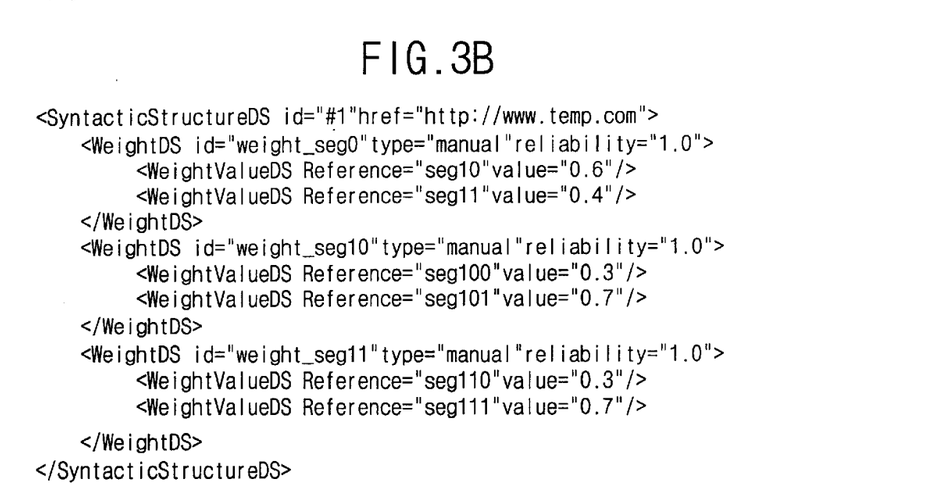

FIG. 2 is a view illustrating a segment DS, and FIGS. 3A and 3B are views illustrating examples of a description of weight information on segments in the segment DS of FIG. 2. As shown in FIGS. 3A and 3B, the weight information on segments in the segment DS are described as a series of weight value DS references and weight values respectively referring to the segments.

In other words, with respect to each of the segment DSs 201 through 207, weight information is described as a series of weight value DS references and weight values referring to each segment DS. FIG. 3A describes weight information of all the segments included in a hierarchical structure, and FIG. 3B describes the weight information thereof included in the hierarchical structure in unit of segment group by each level. As an example of the description of the weight information on the segments, segment 0(seg0) 201 is described as a weight value DS reference(='seg0') and a weight value(=0.6). Other segments are also described as a weight value DS reference and a weight value.

When the order of a plurality of weight value DS references are previously defined, weight information can be described in a n-dimensional vector consisting of only weight values. Under this scheme, no information on weight value DS references would be provided. Since each weight value can be mapped back to the corresponding weight value DS reference according to the previously defined order, the weight value DS references-can be omitted.

When the order of the weight value DS references are not previously defined, weight information can be described as a set of pairs of weight value DS references and their weight values.

Figure 4A:
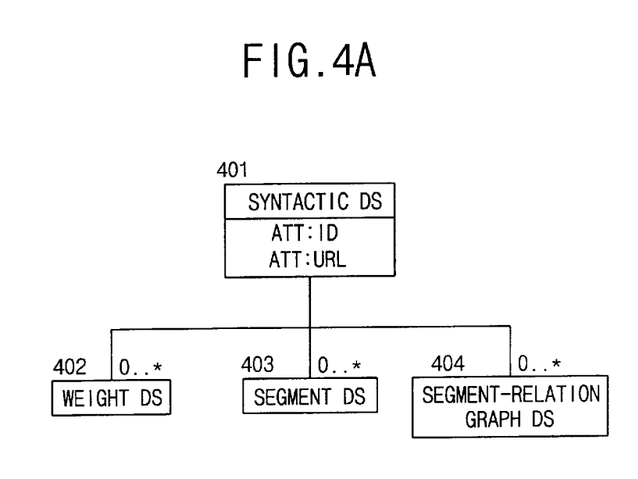
Figure 4B:
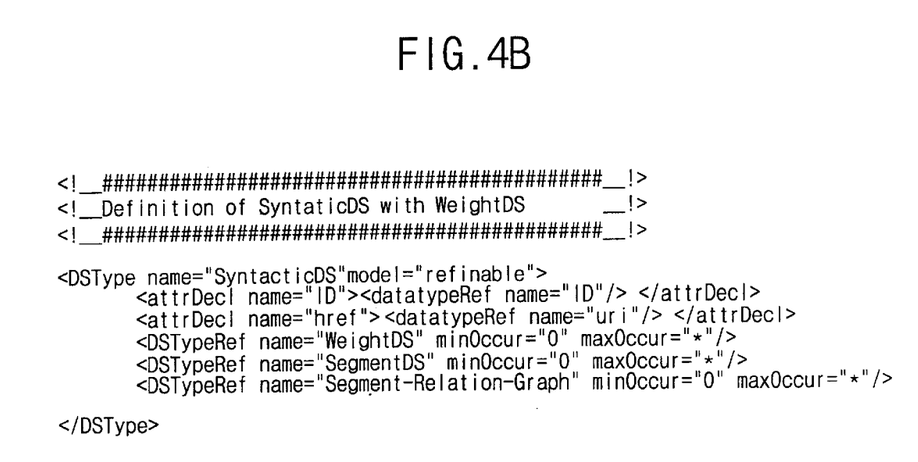

FIGS. 4A and 4B are views illustrating a multimedia syntactic weight DS. FIG. 4A illustrates the syntactic weight DS, and FIG. 4B describes the same in the XML format.

A multimedia weight DS embodying the present invention, as shown in FIGS. 4A and 4B, includes a syntactic DS, which is a multimedia content DS for multimedia content-based indexing and browsing. When the syntactic DS includes a segment DS representing description schemes of segments and a segment-relation graph DS defining the relation between the segments, the syntactic DS describes weight information on the segments or weight information on the relation between the segments by further including more than one weight DS.

The syntactic DS 401 includes a weight DS 402, a plurality of segment DSs 403, and a segment-relation graph DS 404. The weight DS 402 describes weight information on the segments or the segment-relation graph. The segment DS 403 can be constructed hierarchically as shown in FIG. 2. The weight DS can be described as weight information of all segments included in the hierarchical structure as shown in FIG. 3A, or can be described as weight information thereof included in the hierarchical structure in unit of segment group by each level as shown in FIG. 3B. In other words, if the segment DS describes a hierarchical segment description scheme by having another child segment DS, one weight DS included in the syntactic DS can describe weight information of all segments described in the hierarchical segment DS, or each of a plurality of weight DSs can describe weight information of all segments in unit of child segment of one segment included in the hierarchical segment DS.

In the example shown in FIG. 2, because there are three segment groups in the hierarchical structure, the weight information of all segments are described in three weight DSs.

In this way, various forms of weight information can be described using a reference for the target of weighting.

Figure 5A:
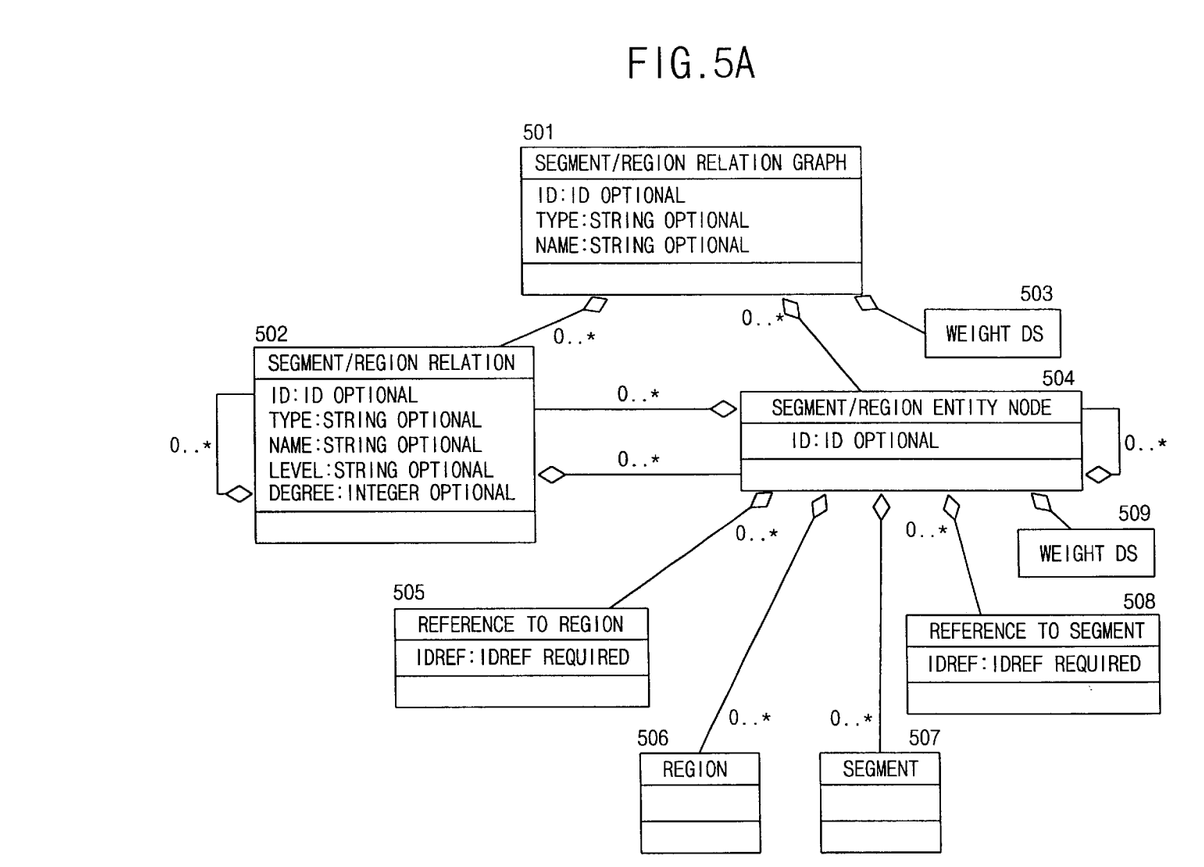
Figure 5B:
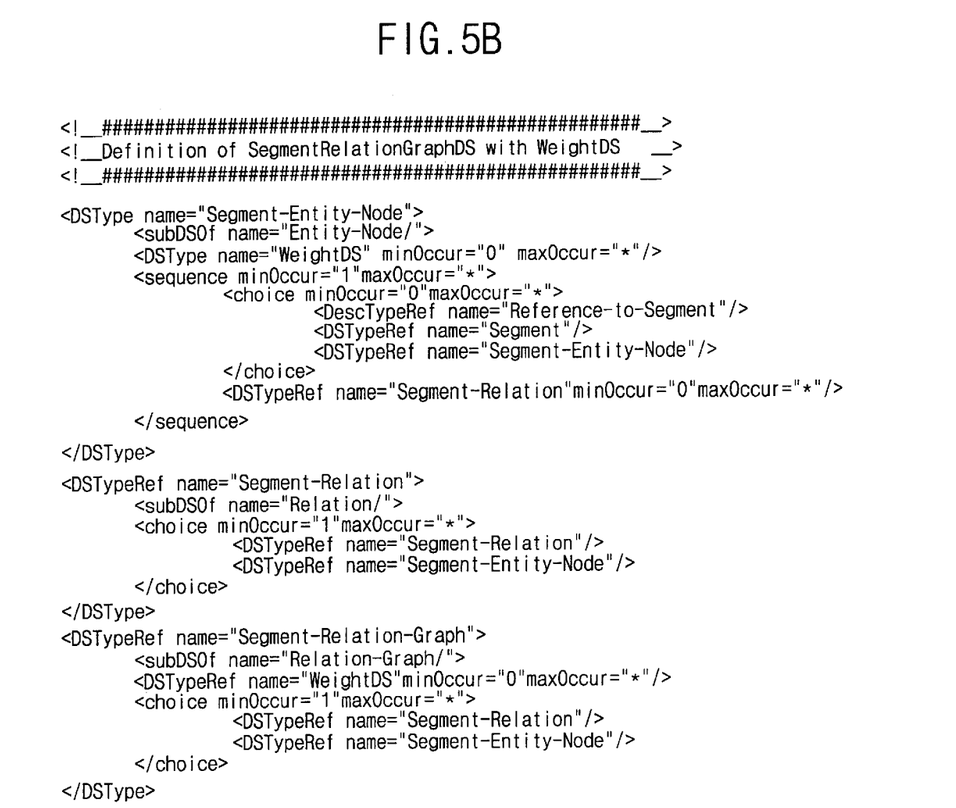

FIGS. 5A and 5B are views illustrating a segment relational graph DS with a weight DS. FIG. 5A illustrates the segment relational graph DS, and FIG. 5B describes the same in the XML format.

A multimedia DS embodying the present invention, as shown in FIGS. 5A and 5B, describes the relationship between segments by describing weight information on segment relations or weight information on segment nodes. This multimedia content DS has a segment relational graph DS consisting of more than one segment relation DS and more than one segment node DS. The segment relation DS can include more than one segment relation DS or more than one segment node. The segment node DS can include more than one segment or segment node DS, or more than one segment relation DS. The segment relation DS can further more than one weight DS. Also, the weight information on segments may be described in such a manner that the segment node DS further includes more than one weight DS.

The segment relational graph DS 501 includes more than one segment relation DS 502 and more than one segment node DS 504. Said segment relation DS 502 may include more than one segment relation DS or segment node. Said segment node DS 504 may include more than one segment, segment node DS, or segment relation DS. The segment node DS 504 may further have a reference to region 505, corresponding regions 506, segments 507, and a reference to segments 508.

Using this DS, a hierarchical segment relational graph can be generated.

The weight DS 503 included in the segment relational graph DS 501 describes weight information on the relations between segments, or weight information on segment nodes. The weight DS 509 included in the segment node DS 504 describes weight information on segments included in the relational graph.

Figure 6A:
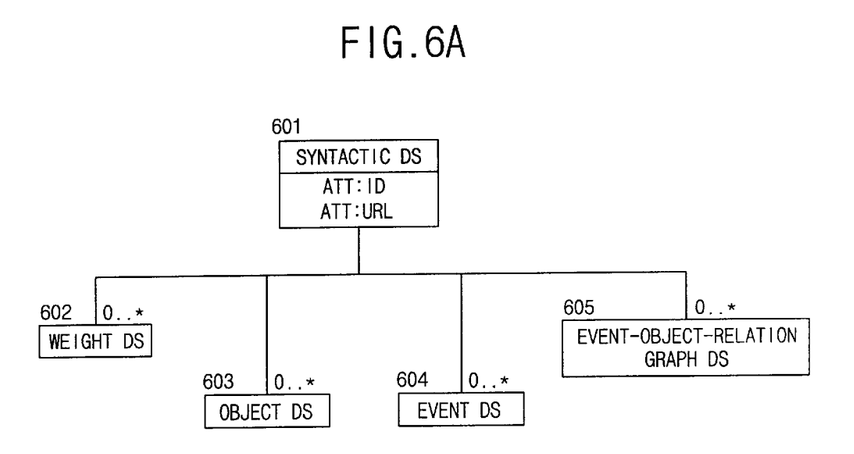
Figure 6B:
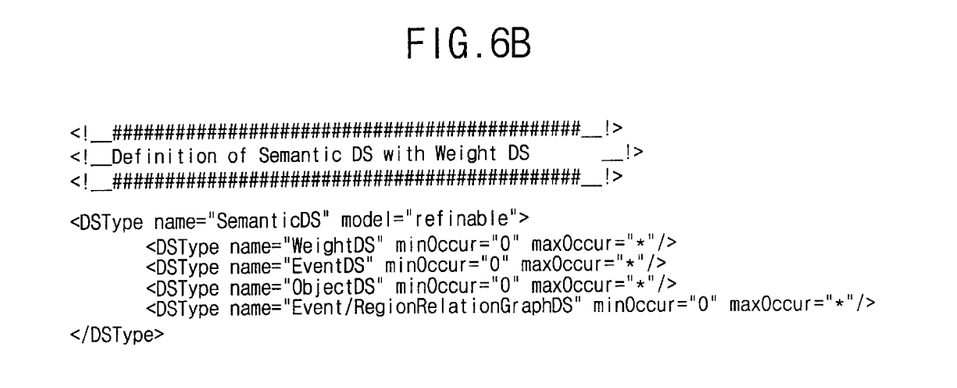

FIGS. 6A and 6B are views illustrating a multimedia syntactic DS with a weight DS. FIG. 6A illustrates the multimedia syntactic DS, and FIG. 6B describes the same in the XML format.

The following description refers to "objects" that can appear in a still picture or a video clip. The term "object" is intended to encompass both inanimate objects, and characters (people) than can appear in a video.

A multimedia DS embodying the present invention, as shown in FIGS. 6A and 6B, describes weight information on objects, weight information on events, or weight information on event/object relational graphs. The multimedia DS enables effective multimedia indexing and browsing in such a manner that a multimedia content DS includes a syntactic DS related with multimedia contents. The syntactic DS may include a plurality of event information, a plurality of object information, and a plurality of event/object relational graph Dss. Said syntactic DS may further include more than one weight DS.

The syntactic DS 601 includes a weight DS 602, a plurality of object DSs 603, a plurality of event DSs 604, and event/object relational graph DS 605. The weight DS 602 describes weight information on objects, weight information on events, or weight information on event/object relational graphs. The object DS 603, event DS 604, and event/object relational graph 605 can be described hierarchically in the same way as in the segment DS and segment relational graph DS. At this time, also, weight information can be described in unit of parts of each hierarchical structure or in the entire hierarchical structure using a reference for the target of weighting.

In other words, in the multimedia DS of FIGS. 6A and 6B, as the object(or event) DS describes a hierarchical object(or event) DS by including another child object(or event) DS, one weight DS included in the syntactic DS can describe weight information of all objects(or events) described in the hierarchical object(or) DS, or each of a plurality of weight DSs can describe weight information thereof in unit of child object(or event) of one object(or event) included in the hierarchical object(or event) structure.

Figure 7A:
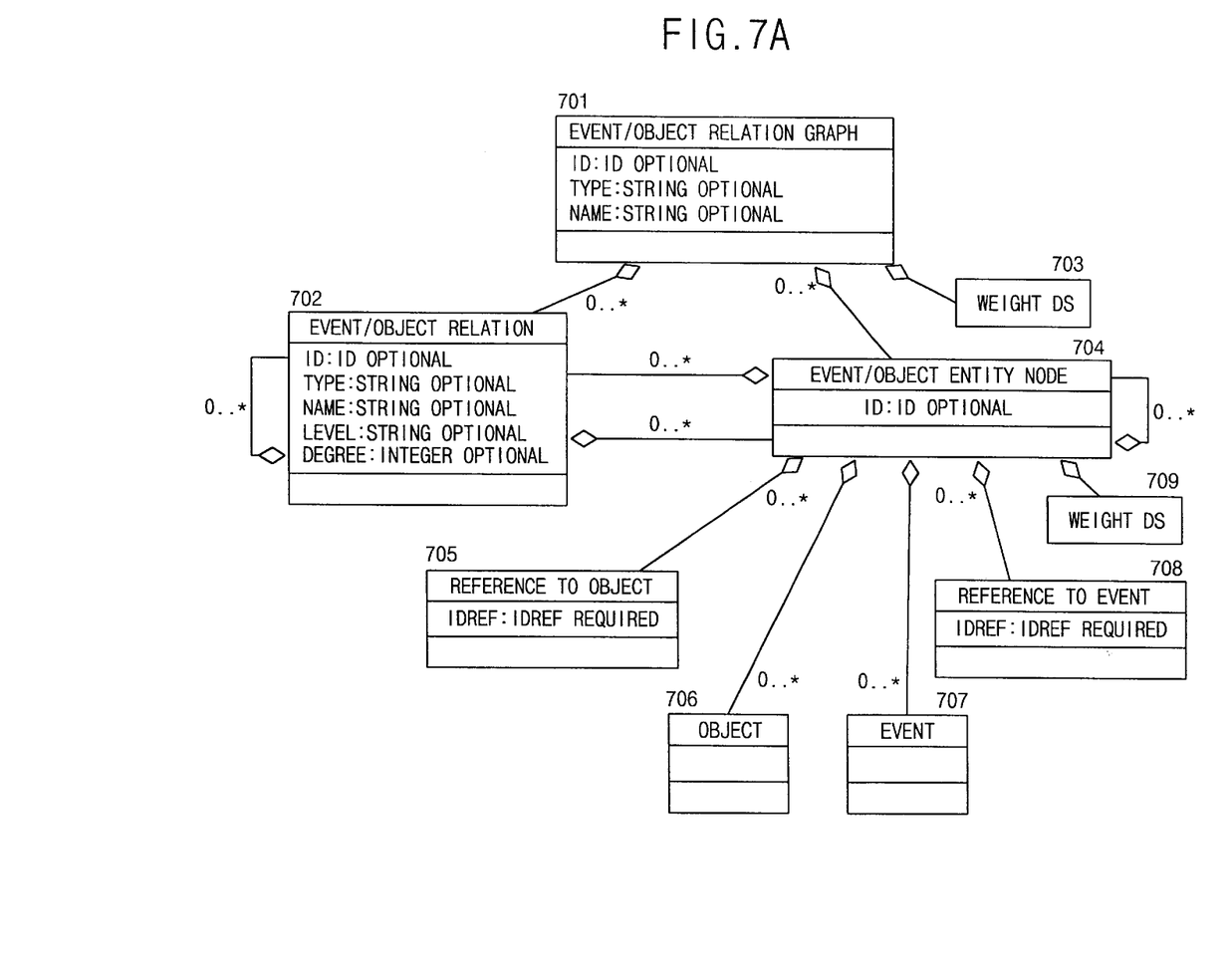
Figure 7B:
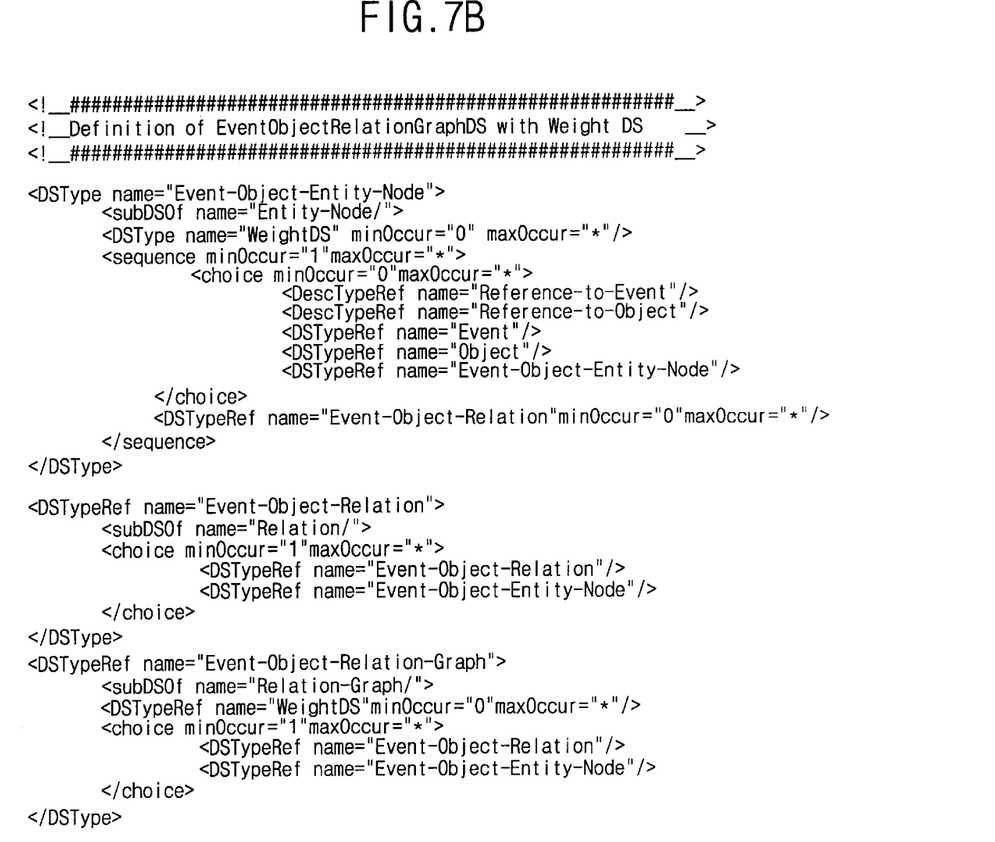

FIGS. 7A and 7B are views illustrating an event/object relational graph DS with a weight DS. FIG. 7A illustrates the event/object relational graph DS, and FIG. 7B describes the same in the XML format.

A multimedia DS embodying the present invention, as shown in FIGS. 7A and B, describes weight information on event/object relations or event/object nodes in such a manner that the event/object relational graph DS includes more than one weight DS. The event/object relational graph DS describes weight information on events or objects in such a manner that an event/object node DS includes more than one weight DS. In order to describe the relation between the objects and the events, when an event/object relation graph DS includes more than one event/object relation DS and more than one event/object node DS, said event/object relation DS may include more than one event/object relation DS or event/object node. Also, said event/object node DS may include more than one object, event, event/object node DS, or event/object relation DS.

The basic DS in FIGS. 7A and 7B is similar to the segment relational graph DS described in FIGS. 5A and 5B. The event/object relational graph DS 701 includes more than one event/object relation DS 702, weight DS 703, and event/object node DS 704. Said event/object relation DS 702 may include more than one event/object relation DS or event/object node. Said event/object node DS 704 may include more than one object 706, event 707, event/object node DS, or event/object relation DS. The event/object node DS 704 consists of a reference to object DS 705, object DS 706, event 707, reference to event 708, and weight DS 709.

The weight DS 703 included in the event/object relational graph DS 701 describes weight information on event/object relations or weight information on event/object nodes. The weight DS 709 included in the event/object node DS 704 describes weight information on events or objects.

As described above, when the weight information is a weight information described with respect to a specific part of the hierarchical structure, or a weight information described with respect to one of many items, such as an object, event, etc., it is identified by means of a weight value DS reference included in the weight DS whether it is a weight information on a certain part, or a weight information on a certain item.

A method for browsing and indexing multimedia having weight information embodying the invention, and a method for displaying multimedia, embodying the invention will now be described.

First, a method of using the multimedia DS and segment relational graph DS including a weight DS, to accomplish a key-frame transition graph type browsing will be described.

A method of displaying a key frame transition graph embodying the invention, includes the steps of: extracting as many key frames as a user wants m the order of weight information on segments described in the weight DS in the multimedia content DS, extracting only relations including the key frames extracted in the segment relational graph DS, and generating a key-frame transition graph using the same.

Another method of displaying a key-frame transition graph embodying the present invention includes the steps of: extracting segment relations in the order of the level of weight information on segment relations described in the weight DS in the segment relational graph DS until the number of key frames that the user wants is reached; and generating a key-frame transition graph using the extracted segment relational graphs.

Hereinafter, the method for displaying a multimedia summary will be described with reference to FIGS. 8A and 8B.

A hierarchical key-frame structure can be described using a segment DS in the multimedia content DS. Also, a key-frame relational graph can be described using a segment relational graph structure. In this instance, a "key-frame relation" means the relation of temporal order between key frames. A temporal transition graph can also be described.

Figure 8A:
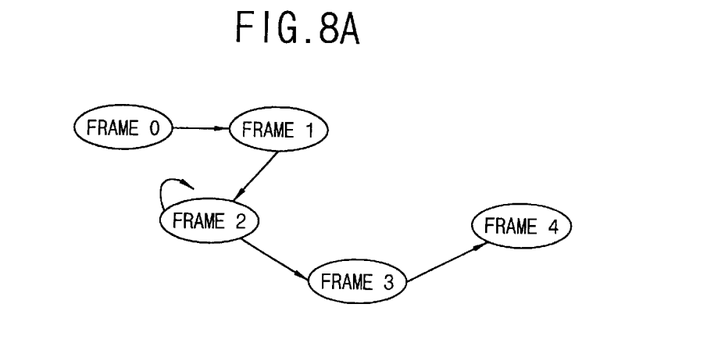
FIGS. 8A and 8B are views illustrating browsing in a key-frame transition graph format using the segment DS and the segment relational graph DS within the multimedia syntactic DS.
Figure 8B:
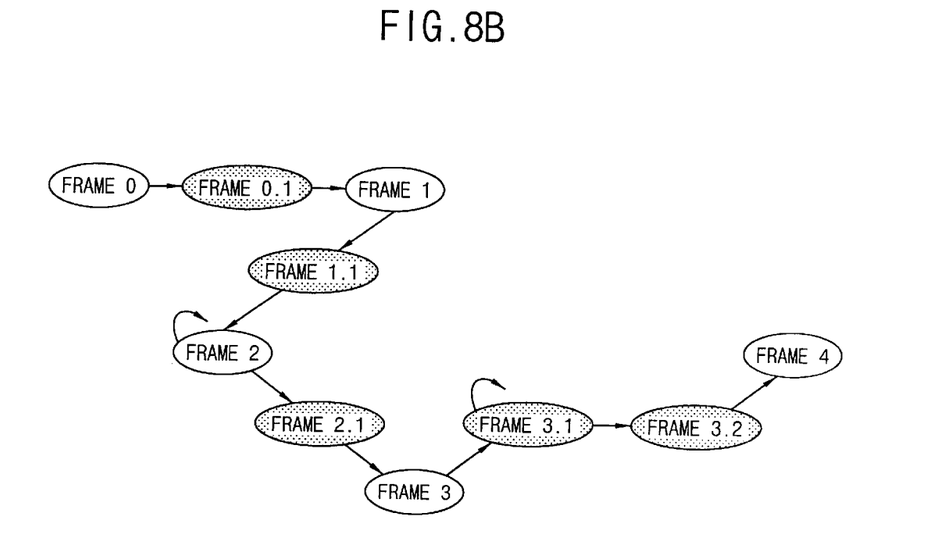

It is possible to conduct key-frame browsing using the segment DS and segment relational graph DS, as shown in FIGS. 8A and 8B. The user may want to adjust the number of nodes of the key-frame transition graph, if the complexity of the key-frame transition graph makes it difficult for the user to understand the multimedia contents. That is, by means of the same DS, a transition graph using five key frames(frame 0~frame 4) as in FIG. 8A, or a transition graph using 10 frames(frame 0, frame 0.1 frame 1, frame 1.1, frame 2, frame 2.1, frame 3, frame 3.1, frame 3.2, frame 4) as in FIG. 8B can be requested.

When a user requests a key-frame transition graph, the graph can be generated with as many key frames as the user wants, in the order of the level of weight information, by using the weight DS included in the DS.

Also, when the user designates the-approximate number of key frames, a key frame transition graph can be generated by extracting as many key frames as the user wants using the weight DS included in the segment relational graph DS in the order of the level of weight information. In this instance, since the extraction is done in the order of the level of not weight information on key frames, but weight information on key-frame transitions, a key frame transitions graph more effectively reflecting the overall flow of contents is provided. However, this method is disadvantageous in that the number of frames that the user wants cannot always be accurately reflected.

Next, a character/relation-based video clip browser using the multimedia semantic DS and event/object relational graph DS including a weight DS will be described.

In indexing videos based on a character/relation DS, and displaying the same, the method for displaying the videos is characterized in that characters are arranged in the order of weight information on objects described by a weight DS. A relational transition between two characters is arranged in the order of weight information on the relations between objects described by a weight DS included in the above event/object relational graph DS. Key frames of event segments satisfying the relation between the selected two characters are arranged in the order of weight information on segments described by a weight DS included in the DS.

A method for displaying videos based on character/relation will now be described with reference to FIG. 9.

Generally, since the contents of a video is displayed based on the relation between main characters, a method for indexing and browsing videos based on the relation between characters can be usefully utilized. Such a utilization is made possible using objects(characters) and a event/objects relational graph DS included in the multimedia content DS.

Figure 9:
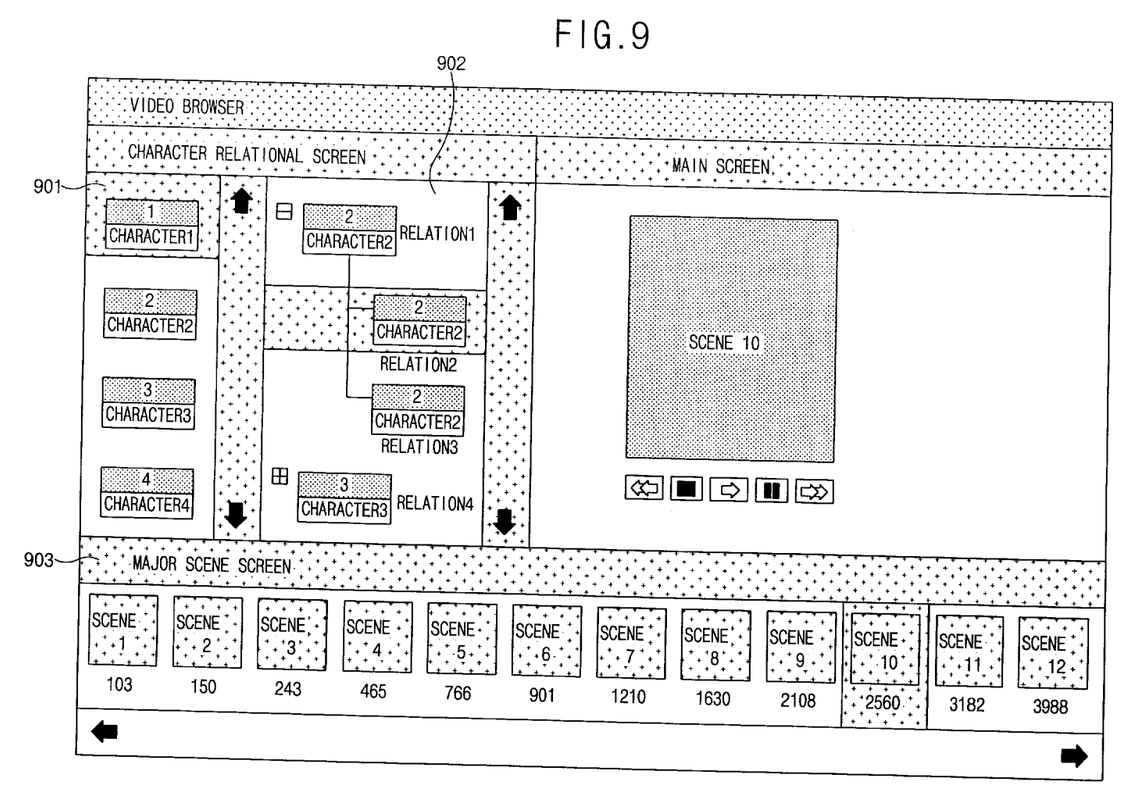
FIG. 9 is a view illustrating an example of a character/relation-based moving image browser.

A basic user interface of such a browser is illustrated in FIG. 9. In FIG. 9, a character screen 901 arranges characters appearing in the contents of videos, and a character/relation screen 902 arranges characters related with the characters selected in the character screen 901. At the same time, the character/relation screen 902 describes changes in the relation between the selected two characters. A main scene screen 903 arranges key frames representing event segments satisfying the specific relation between these characters.

The order of arranging the characters arranged in the character screen 901 is set by means of the weight DS included in the content DS. That is, the characters can be arranged in the order of priority using weight information on the objects.

In addition, the order of displaying the relations between the characters described in the character/relation screen 902 can be determined using the weight DS included in the event/object relational graph DS.

Finally, the order of key frames satisfying the selected relation is determined using the weight DS included in the content DS describing weight information on segments.

As described above, in a structure for multimedia content-based indexing and browsing, the present invention enables higher-performance indexing and browsing by describing effective weight information on each content DS. In addition, the present invention provides a weight DS corresponding to a complex multimedia content DS in various ways, for thereby preparing a multimedia standard for multimedia indexing and browsing using weight information.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of indexing and characterizing multimedia content, comprising:

assigning, for each of a plurality of items of multimedia content:
a weight type that indicates the type of a weight measure,
a weight value, and
a weight reliability that indicates the reliability of the assigned weight value; and
generating an index of the plurality of items of multimedia content based on at least one of the assigned weight types, the assigned weight values and the assigned weight reliabilities.

2. The method of claim 1, wherein the step of generating an index is based on the assigned weight reliabilities.

3. The method of claim 1, wherein the step of generating an index is based on the assigned weight types.

4. The method of claim 1, wherein the assigning step comprises assigning a plurality of sets of weighting values to a single item of multimedia content, and wherein each set of weighting values comprises a weight type, a weight value and a weight reliability.

5. The method of claim 1, wherein the assigning step comprises assigning weight values to the plurality of items of multimedia content in a predetermined order, and wherein the weight values for the plurality of items of multimedia content are described as an n-dimensional vector.

6. The method of claim 1, wherein each weight value comprises a reference to a particular item of multimedia content and a weighting measure for the referenced item of multimedia content.

7. The method of claim 1, wherein the step of generating an index is based on the assigned weight values.

8. The method of claim 7, wherein the step of generating an index is also based on the assigned weight reliabilities.

9. The method of claim 8, wherein the step of generating an index is also based on the assigned weight types.

10. A method of indexing a plurality of segments of multimedia content, comprising:

assigning a segment description weight value for each of a plurality of segments of multimedia content;

generating a segment relation index that indicates relationships between the plurality of segments of multimedia content; and generating an index of the plurality of segments of multimedia content based on the assigned description weight values and the segment relation index.

11. The method of claim 10, wherein at least one segment includes a plurality of sub-segments, and wherein the step of assigning a segment description weight value for the at least one segment comprises assigning a description weight value that describes information for all the sub-segments of the at least one segment.

12. The method of claim 10, wherein at least one segment includes a plurality of sub-segments that are arranged in a parent-child hierarchical structure, and wherein the step of assigning a segment description weight value for the at least one segment comprises assigning a plurality of sub-element description weight values for the plurality of sub-elements.

13. The method of claim 10, wherein at least one segment of multimedia content comprises a plurality of sub-segments that are arranged in a parent-child hierarchical structure, wherein the parent sub-segments comprise nodes, and wherein the step of generating a segment relation index comprises:

generating information describing relationships between the plurality of segments of multimedia content; and generating information describing the nodes.

14. A method of generating a key frame transition graph, comprising:

indexing a plurality of segments of multimedia content as recited in claim 10, wherein each of the plurality of segments comprise at least one frame of image data;

identifying a predetermined number of frames of image data from within the plurality of segments of multimedia content based on weight values assigned during the indexing step; and generating a key frame transition graph using the identified frames of image data.

15. The method of claim 14, further comprising selecting key frames from the identified predetermined number of frames of image data based on the segment relation index generated during the indexing step, and wherein the step of generating a key frame transition graph utilizes only the selected key frames.

16. A method of indexing a plurality of segments of multimedia content, comprising:

assigning an object weight value for each of a plurality of segments of multimedia content;

assigning an event weight value for each of the plurality of segments of multimedia content;

generating an event/object relation index that indicates relationships between events and objects presented in the plurality of items of multimedia content; and generating an index of the plurality of segments of multimedia content based on the assigned object weight values, the assigned event weight values, and the event/object relation index.

17. The method of claim 16, wherein at least one segment includes a plurality of sub-segments, wherein the step of assigning an object weight value for the at least one segment comprises assigning an object weight value that describes information for all the sub-segments of the at least one segment.

18. The method of claim 17, wherein the step of assigning an event weight value for the at least one segment comprises assigning an event weight value that describes information for all the sub-segments of the at least one segment.

19. The method of claim 16, wherein at least one segment includes a plurality of sub-segments that are arranged in a parent-child hierarchical structure, and wherein the step of assigning an object weight value for the at least one segment comprises assigning a plurality of sub-element object weight values for the plurality of sub-elements.

20. The method of claim 19, wherein the step of assigning an event weight value for the at least one segment comprises assigning a plurality of sub-element event weight values for the plurality of sub-elements.

21. The method of claim 16, wherein at least one segment of multimedia content comprises a plurality of sub-segments that are arranged in a parent-child hierarchical structure, wherein the parent sub-segments comprise nodes, and wherein the step of generating an event/object relation index comprises:

generating information describing relationships between the events and objects presented in the plurality of items of multimedia content; and generating information describing the nodes.

22. A method of selecting and displaying segments of multimedia content, comprising:

indexing a plurality of segments of multimedia content as recited in claim 16;

selecting at least one segment of multimedia content based on at least one of the object weight values and the event weight values assigned during the indexing step; and displaying the at least one segment of multimedia content in response to a user request.

23. The method of claim 22, wherein when a plurality of segments are selected during the selecting step, the method further includes:

displaying a plurality of icons, wherein each icon corresponds to one of the plurality of selected segments; and displaying a selected segment corresponding to an icon when the icon is selected by a user.

24. The method of claim 22, wherein the selecting step is also based on the event/object relation index generated during the indexing step.

25. The method of claim 24, wherein the selecting step is also based on user input.

26. A multimedia description scheme, wherein at least one weighting description scheme is used to characterize multimedia content, and wherein the at least one weighting description scheme comprises a weight information type, meaning the criteria for defining a weight value, a weight information according to the criteria defined by the weight information type, and a reliability, which indicates the reliability of weight information assigned to a multimedia target according to the weight information type.

27. The multimedia description scheme of claim 26, wherein if the order of weighting values is not previously defined, each weight information comprises a reference to a multimedia target, and a weight value for the target.

28. A multimedia description scheme for enabling effective indexing and browsing, characterized in that: weight information on segments or weight information on segment relations is described in such a manner that the multimedia content description scheme includes a segment description scheme and a segment relational graph description scheme, said multimedia content description scheme further including more than one weight description scheme.

29. The multimedia description scheme of claim 28, wherein, when the segment description scheme describes a hierarchical segment structure including another child segment description scheme, one weight description scheme included in the multimedia description scheme describes weight information on all segments described in the hierarchical segment structure, or a plurality of weight description schemes each describe weight information in unit of child segments of one segment included in the hierarchical segment structure.

30. The multimedia description scheme of claim 28, wherein when a multimedia content description scheme has a segment relational graph description scheme consisting of more than one segment relation description scheme and more than one segment node description scheme, said one segment relation description scheme includes more than one segment relation description scheme or more than one segment node, and said one segment node description scheme includes more than one segment or segment node description scheme, or more than one segment relation description scheme, and wherein the segment relational graph description scheme describes weight information on segment relations or weight information on segment nodes by further including more than one weight description scheme, and the segment node description scheme describes weight information on segments by further including more than one weight description scheme.

31. A multimedia description scheme for enabling effective multimedia indexing and browsing, characterized in that: weight information on objects, weight information on events, or weight information on event/object relational graphs are described in such a manner that the multimedia content description scheme includes a content description scheme comprising a plurality of event information, a plurality of object information, and a plurality of event/object relational graph description schemes, said content description scheme further including more than one weight description scheme.

32. The multimedia description scheme of claim 31, wherein, when the event or object description scheme describes a hierarchical object or event description scheme by including another child object event description scheme, one weight description scheme included in the content description scheme describes weight information on all objects or events described in the hierarchical object or event description scheme.

33. The multimedia description scheme of claim 31, wherein, when the event or object description scheme describes a hierarchical object or event description scheme by including another child object event description scheme, a plurality of weight description schemes included in the content description scheme each describe weight information in unit of child object/event of one object/event included in the hierarchical object or event description scheme.

34. A multimedia description scheme for enabling effective multimedia indexing and browsing, characterized in that: weight information on relations between events and objects or weight information on event or object nodes is described in such a manner that a multimedia event/object relational graph description scheme further includes more than one weight description scheme, and weight information on events or objects is described in such a manner that an event or object node description scheme further includes more than one weight description scheme.

35. A method of indexing and characterizing multimedia content, comprising:
   assigning, for each of a plurality of items of multimedia content:
      a weight value, and
      a weight reliability that indicates the reliability of the assigned weight value; and
   generating an index of the plurality of items of multimedia content based on the assigned weight values and the assigned weight reliabilities.

36. The method of claim 35, wherein the assigning step comprises assigning a plurality of sets of weighting values to a single item of multimedia content, and wherein each set of weighting values comprises a weight value and a weight reliability.

37. The method of claim 35, wherein the assigning step comprises assigning weight values to the plurality of items of multimedia content in a predetermined order, and wherein the weight values for the plurality of items of multimedia content are described as an n-dimensional vector.

38. A method of indexing a plurality of segments of multimedia content, comprising:
   assigning an object weight value for each of a plurality of segments of multimedia content;
   assigning an event weight value for each of the plurality of segments of multimedia content; and
   generating an event/object relation index that indicates relationships between events and objects presented in the plurality of segments of multimedia content.

39. The method of claim 38, further comprising the step of generating an index of the plurality of segments of multimedia content based on at least the event/object relation index.

40. The method of claim 38, wherein at least one segment includes a plurality of sub-segments, and wherein the steps of assigning an object weight value and assigning an event weight value comprise assigning weight values that describe information for all the sub-segments of the at least one segment.

41. The method of claim 38, wherein at least one segment includes a plurality of sub-segments that are arranged in a parent-child hierarchical structure, and wherein the steps of assigning an object weight value and assigning an event weight value for the at least one segment comprise assigning a plurality of sub-element weight values for the plurality of sub-elements.

42. The method of claim 38, wherein at least one segment of multimedia content comprises a plurality of sub-segments that are arranged in a parent-child hierarchical structure, wherein the parent sub-segments comprise nodes, and wherein the step of generating an event/object relation index comprises:
   generating information describing relationships between the events and objects presented in the plurality of items of multimedia content; and
   generating information describing the nodes.

* * * * *